(12) United States Patent
Bower, III et al.

(10) Patent No.: US 7,380,173 B2
(45) Date of Patent: May 27, 2008

(54) IDENTIFYING TEMPORAL AMBIGUITY IN A AGGREGATED LOG STREAM

(75) Inventors: Fred Allison Bower, III, Durham, NC (US); Rodney Hugh Brown, Cary, NC (US); Tushar Dasharath Fadale, Raleigh, NC (US); Thomas James Fox, Apex, NC (US); Richard Edwin Harper, Chapel Hill, NC (US); David Bryan Roberts, Cary, NC (US); Ketan K. Shah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 10/910,016

(22) Filed: Aug. 3, 2004

(65) Prior Publication Data

US 2006/0031719 A1    Feb. 9, 2006

(51) Int. Cl.
    *G06F 11/00* (2006.01)
(52) U.S. Cl. .............................. 714/39; 714/4; 714/20
(58) Field of Classification Search .................... 714/4, 714/20, 39
    See application file for complete search history.

(56) References Cited

U.S. PATENT DOCUMENTS

| | | | |
|---|---|---|---|
| 5,613,113 A | 3/1997 | Goldring | |
| 5,737,600 A | 4/1998 | Geiner et al. | |
| 5,878,434 A | 3/1999 | Draper et al. | |
| 5,896,524 A | 4/1999 | Halstead, Jr. et al. | |
| 6,078,930 A | 6/2000 | Lee et al. | |
| 6,148,338 A | 11/2000 | Lachelt et al. | |
| 6,192,378 B1 | 2/2001 | Abrams et al. | |
| 6,243,702 B1 | 6/2001 | Bamford et al. | |
| 6,574,665 B1 | 6/2003 | Khotimsky | |
| 6,751,573 B1* | 6/2004 | Burch | 702/178 |
| 6,931,355 B2* | 8/2005 | Farrell et al. | 702/187 |
| 7,039,773 B2* | 5/2006 | Hu et al. | 711/158 |
| 2003/0079205 A1 | 4/2003 | Miyao et al. | |
| 2004/0153999 A1* | 8/2004 | Miyao et al. | 717/128 |
| 2005/0114321 A1* | 5/2005 | DeStefano et al. | 707/3 |

OTHER PUBLICATIONS

Index, ITCL (Interval Temporal Checking Logic) pp. 1-20.
Dmitriy Ayrapetov, Archana Ganapathi and Larry Leung, Improving the Protection of Logging Systems, UC Berkley Computer Science, Berkeley, CA.
Brian Tierney, et al., The NetLogger Methodology for High Performance Distributed Systems Performance Analysis, IEEE HPDC-7'9 Chicago, Illinios pp. 28-31.

\* cited by examiner

*Primary Examiner*—Robert Beausoliel
*Assistant Examiner*—Charles Ehne
(74) *Attorney, Agent, or Firm*—Cynthia S. Byrd; Dillon & Yudell LLP

(57) ABSTRACT

A method and system for ordering and aggregating log streams. Log streams for events from different sources are received. If different sources have different recording cycles, or time epochs, that lead to different temporal granularities, then all of the log streams are combined into a single time epoch that is equal to the longest time epoch. Log streams from sources having shorter time epochs continue to retain information about their original time epochs, in order to retain information about the order of the events in those log streams. The log streams are re-ordered, both before and after being integrated into the aggregate log, by acquiring additional data from the different sources, thus permitting the likely cause/effect relationship between events.

12 Claims, 10 Drawing Sheets

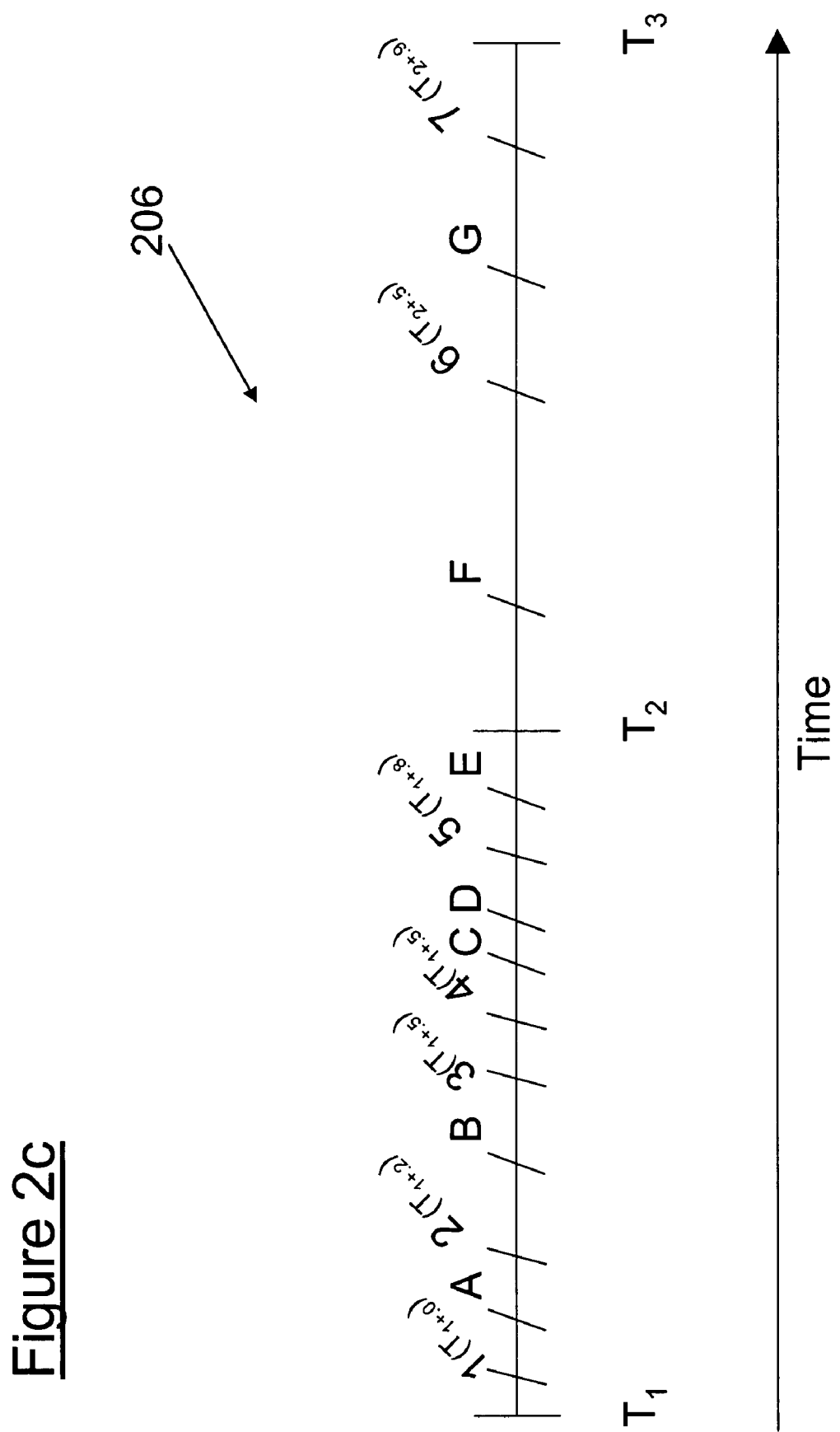

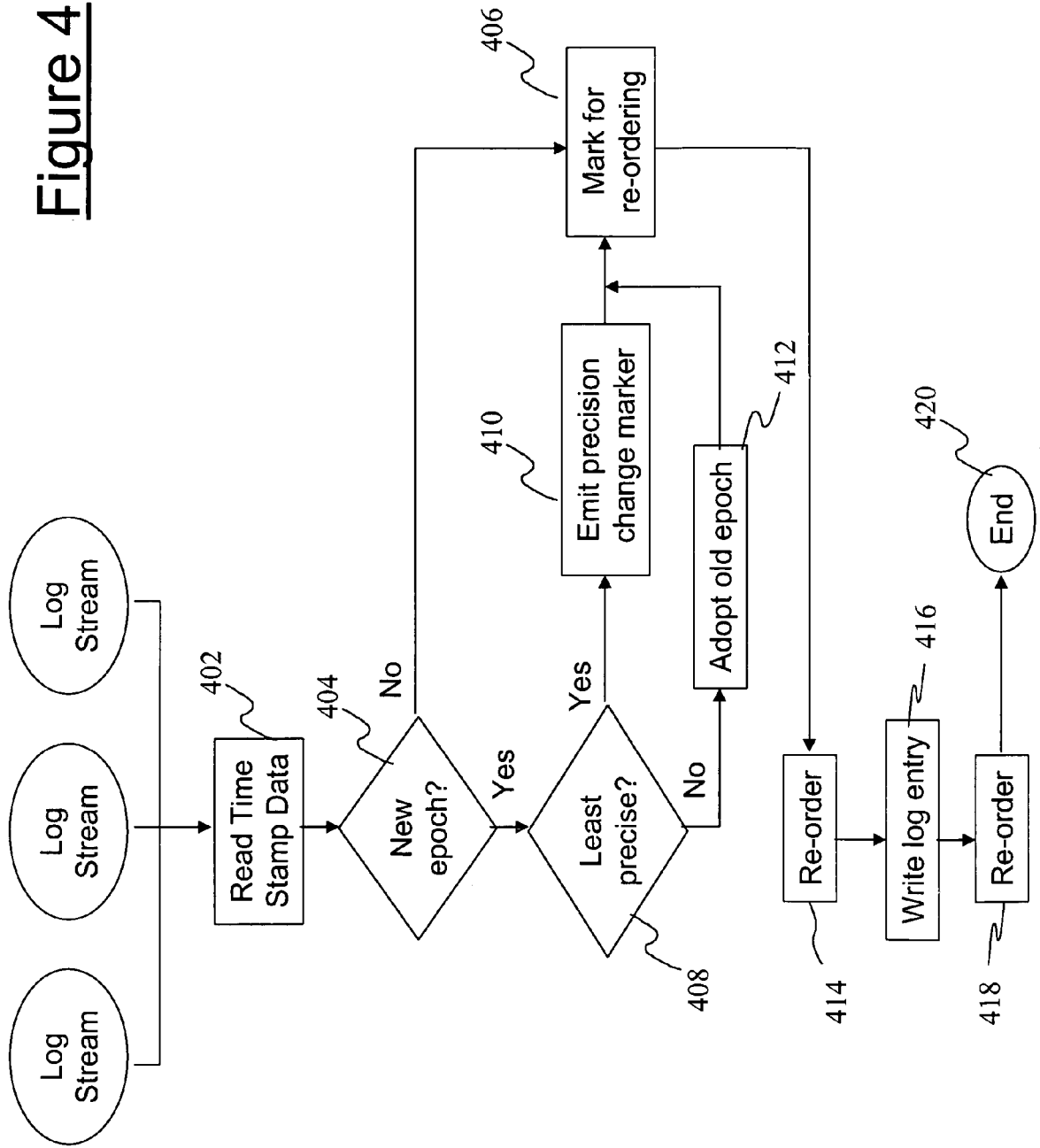

IDENTIFYING TEMPORAL AMBIGUITY IN A AGGREGATED LOG STREAM

BACKGROUND OF THE INVENTION

1. Technical Field

The present invention relates in general to the field of computers, and in particular to event logs in computers. Still more particularly, the present invention relates to a method and system for identifying temporal granularity of multiple event log streams to aid in the organization of an aggregate event log.

2. Description of the Related Art

In computing systems, a record of events (e.g., completion of an operation, an input/output operation, an error signal, a flag setting, a system crash, etc.) is generated and logged by a large number of independent hardware and software components. This record can be useful in analyzing or predicting system failures, particularly when combined into a single, chronological merged log. For example, a record showing an input (software event) from an unknown source immediately followed by a disk crash (hardware event) is a good indicator that the input from the unknown source caused the disk to crash.

In many instances, the precision of the clocks involved in generating the record of events varies greatly. For example, hardware counters may be accurate to the microsecond, while records of software events may only be accurate in the millisecond range. As a result of this varying precision, properly ordering events from different sources becomes impossible based upon clock information alone. As an example, consider a record of a software event compared to a record of a hardware event, as shown in FIG. 1. A log stream 102a is a record of software events, and a log stream 104a is a record of events from a specific piece of hardware. As shown, log stream 102a has a temporal granularity of 1.0 units of time (such as milliseconds), while log stream 104a has a temporal granularity of 0.1 units of time. Events A-E occur after time $T_1$ and before time $T_2$, although not necessarily at the places on the time line represented by log stream 102a. That is, events "A" and "B" are both marked as having occurred at time $T_1$ and may actually occur at any time between time $T_1$ and time $T_2$. Furthermore, events A-E may or may not occur in the order shown, depending on the capability of the log generator that created the log stream 102.

As shown, log stream 104a has a temporal granularity of 0.1 units of time. Thus, it is certain from viewing log stream 104a that event "1" occurred before event "2," which is in a time frame that is subsequent to the time frame in which event "1" occurred. Similarly, event "2" occurred before events "3" and "4." Event "3" may or may not have occurred before event "4," again depending on the capability of the log generator that created log stream 104a.

Even though there is an ambiguity of when and in what order the events occurred on log stream 102a, the information shown in log stream 104a in FIG. 1a is useful, since events "1-5" are temporally ordered (with the possible ambiguity of events "3" and "4"). However, when creating an aggregate log of log stream 102a and log stream 104a, some type of common time epoch must be used. This commonality is typically obtained by placing all events within a lowest common temporal granularity. Thus, as shown in FIG. 1b, log stream 102a and log stream 104b have the same temporal granularity of 1.0 units of time. While the order of events "1-5" can still be assumed (except possibly for the order of events "3" and "4"), the information describing the temporal spacing of these events is lost. That is, it is no longer known whether some or all of the events occurred near time $T_1$, time $T_2$, or at a time sometime between times $T_1$ and $T_2$.

Alternatively, the events in log stream 102b can be assigned purely arbitrary time extensions to appear to give the same temporal granularity as that of log stream 104a, as shown in FIG. 1c. Thus, event "A" is given an arbitrary time of $T_{1.1}$, which is likely not an accurate representation of when event "A" occurred, since events A-E could have occurred at any time between times $T_1$ and $T_2$. Similarly, every event in log stream 102b may be given arbitrary time extensions, which may be the same or different for each event.

Thus, in FIG. 1b, information is lost from log stream 104, and in FIG. 1c, potentially erroneous information is introduced into log stream 102.

Another alternative for merging log streams is to combine the two log streams into an aggregate log by using the less-accurate time division (e.g., that used in log stream 102) and feeding all events from both log stream 102 and log stream 104 into the aggregate log. However, like the method shown in FIG. 1b, the temporal order of events in log stream 104 is lost, and there is still no way to know the temporal order of the events from the two log streams.

What is needed, therefore, is a method and system for merging log streams of disparate temporal granularity into a stream having the least precise common time epoch while maintaining the temporal information about events from the more precise log stream. Preferably, the combined aggregate log should be able to be further refined to correctly order events that were previously ordered ambiguously.

SUMMARY OF THE INVENTION

Therefore, the present invention is directed to a method and system for ordering and aggregating log streams. Log streams for events from different sources are received. If different sources have different recording cycles, or time epochs, that lead to different temporal granularities, then all of the log streams are combined into a single time epoch that is equal to the longest time epoch. Log streams from sources having shorter time epochs continue to retain information about their original time epochs, in order to retain information about the order of the events in those log streams. The log streams are re-ordered, both before and after being integrated into the aggregate log, by acquiring additional data from the different sources, thus permitting the likely cause/effect relationship between events.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 2a-d illustrate the method and system used to aggregate log streams into an aggregate log using the present invention;

FIG. 4 is a flow chart illustrating steps taken to dynamically re-assign a baseline time epoch for log streams.

DETAILED DESCRIPTION OF A PREFERRED EMBODIMENT

Figure 1A:
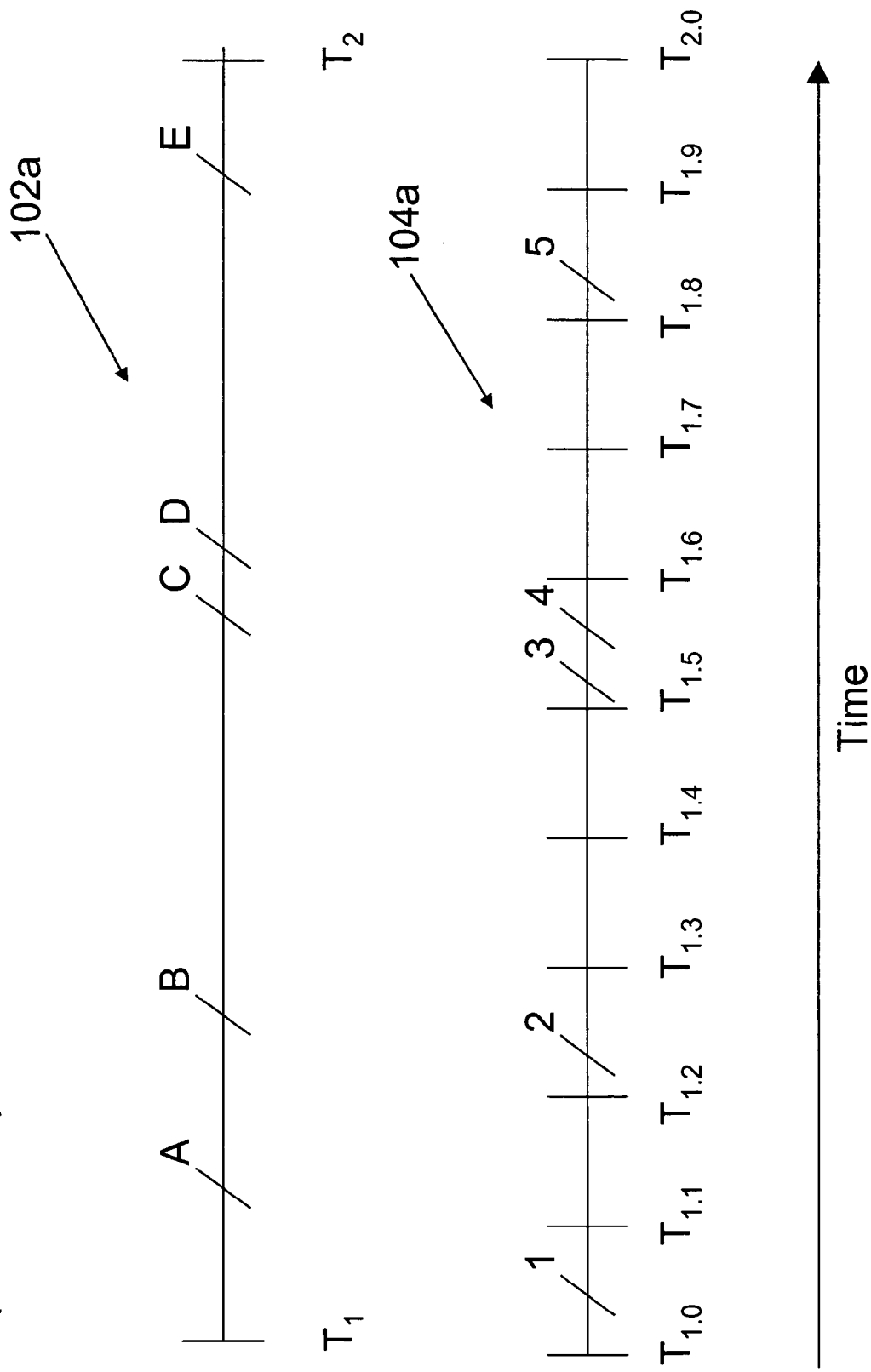
FIGS. 1a-c depict prior art methods of dealing with log streams having different time epochs.
Figure 1B:
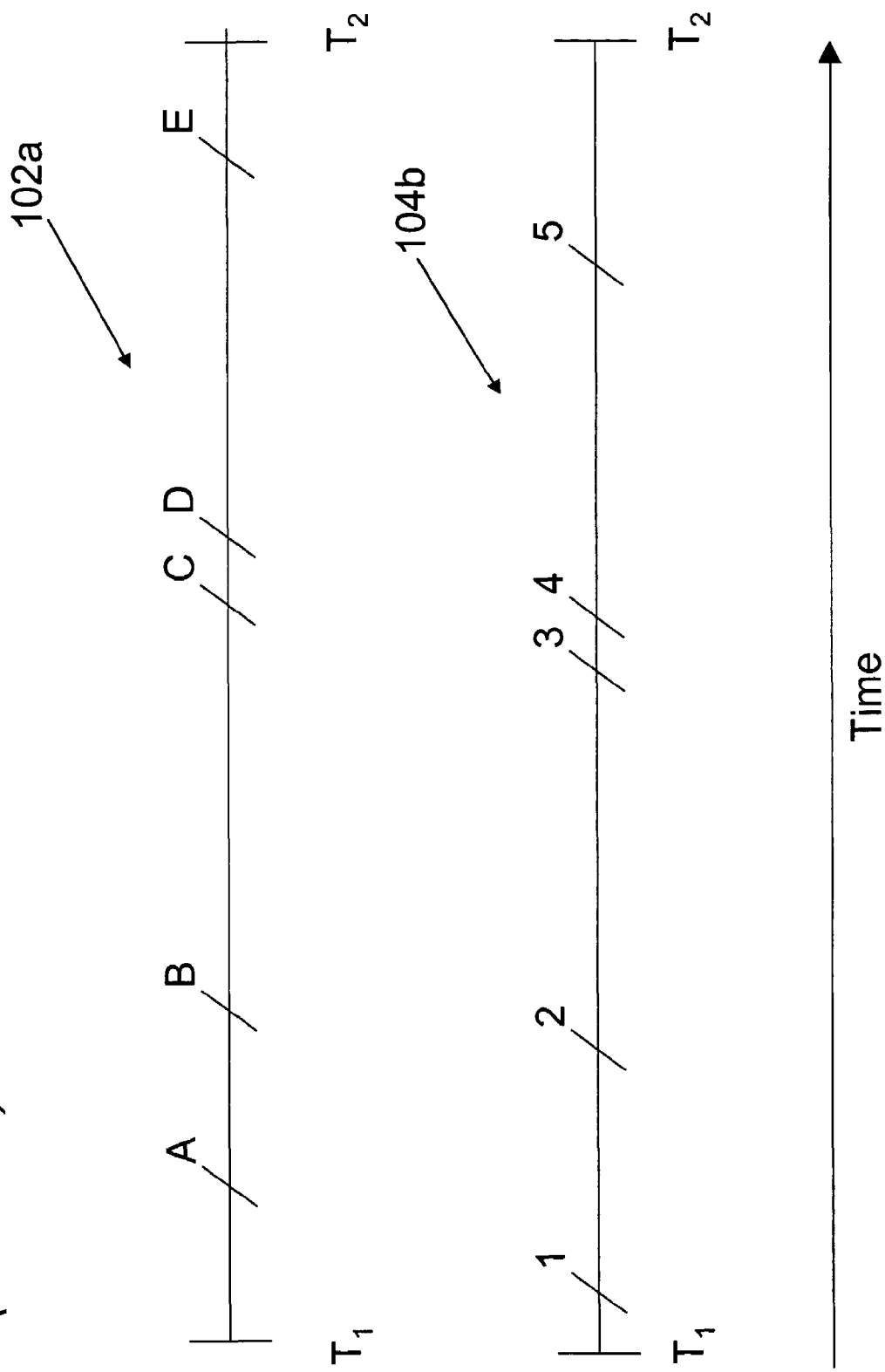
Figure 1C:
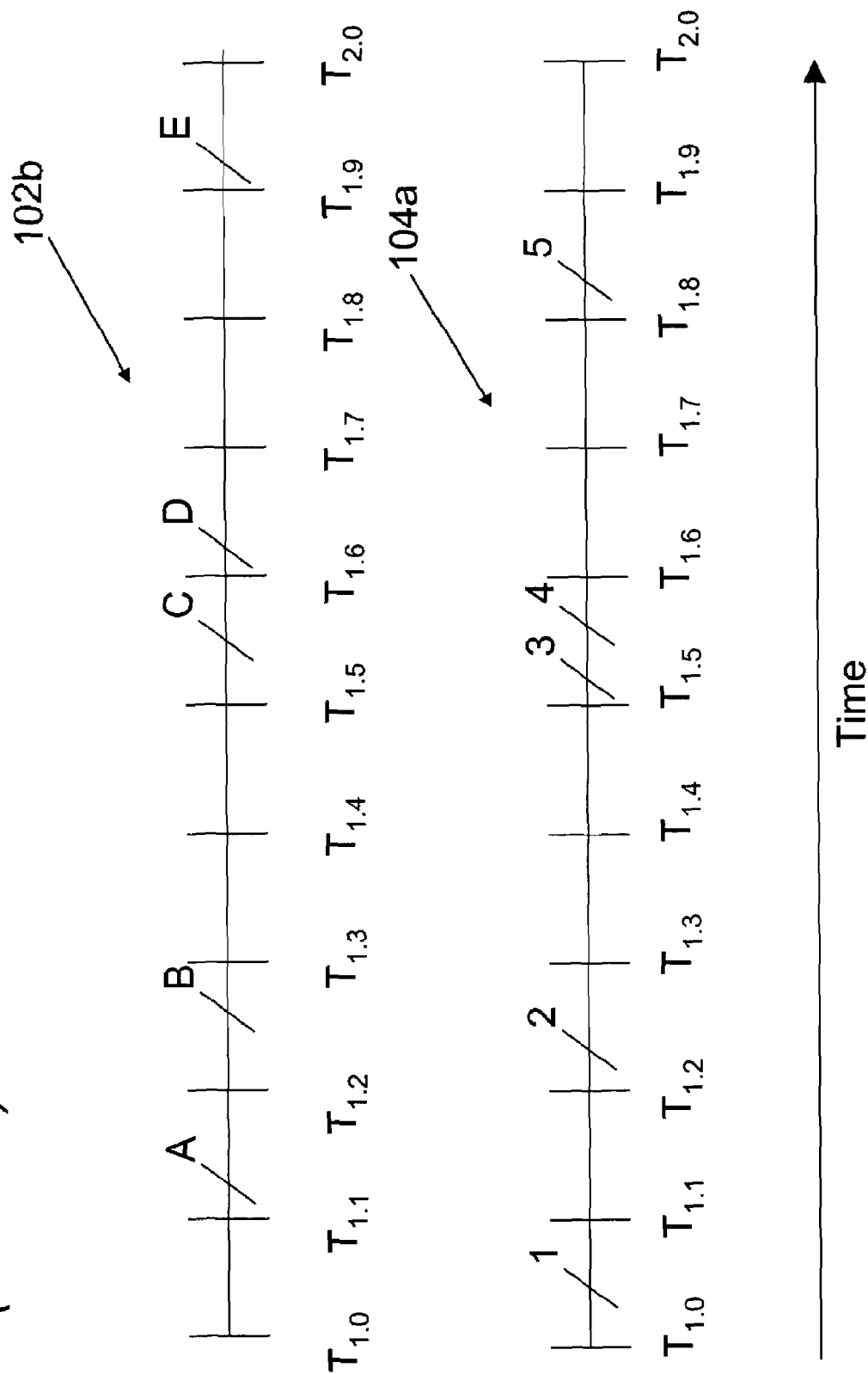
Figure 2A:
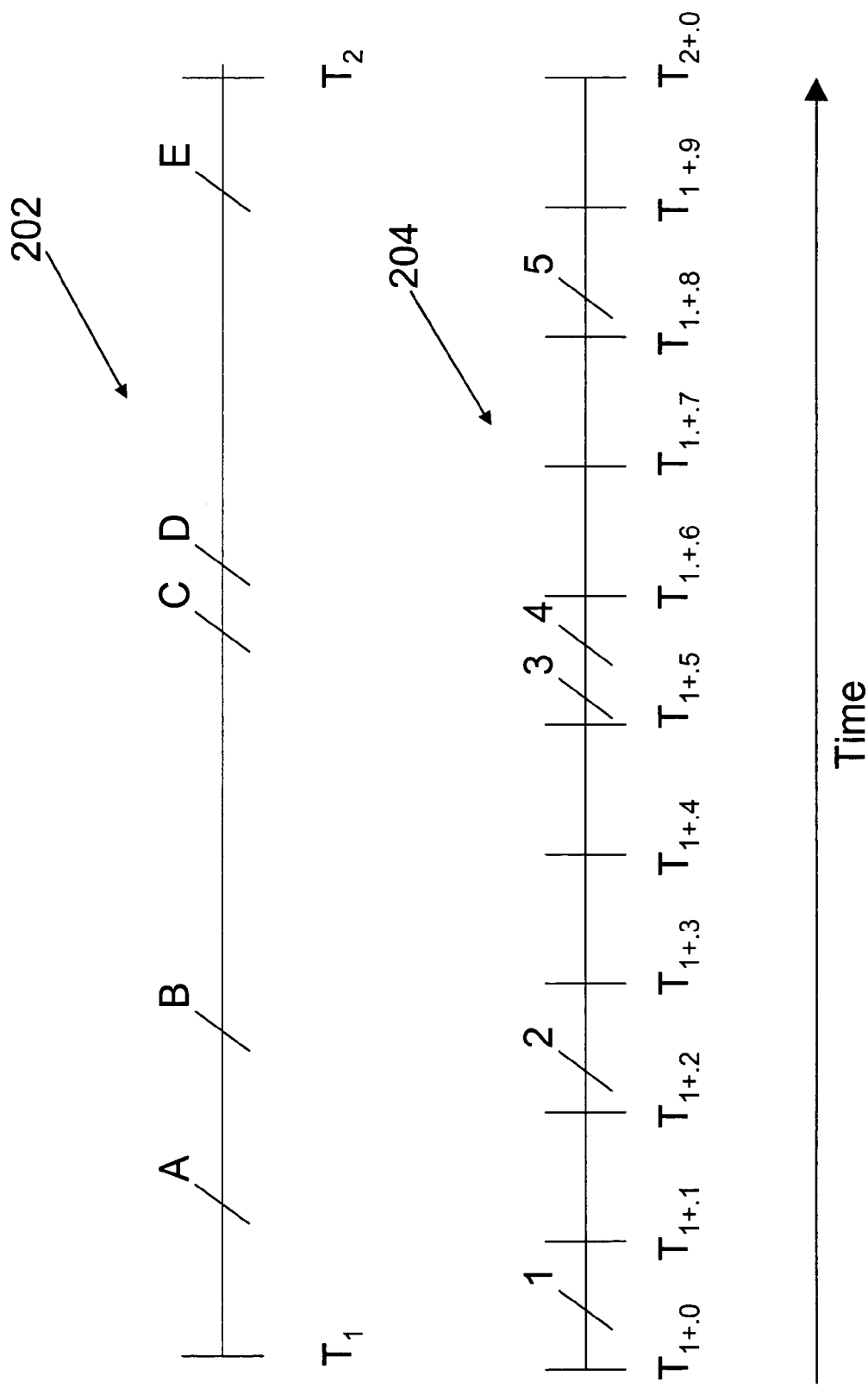
Figure 2B:
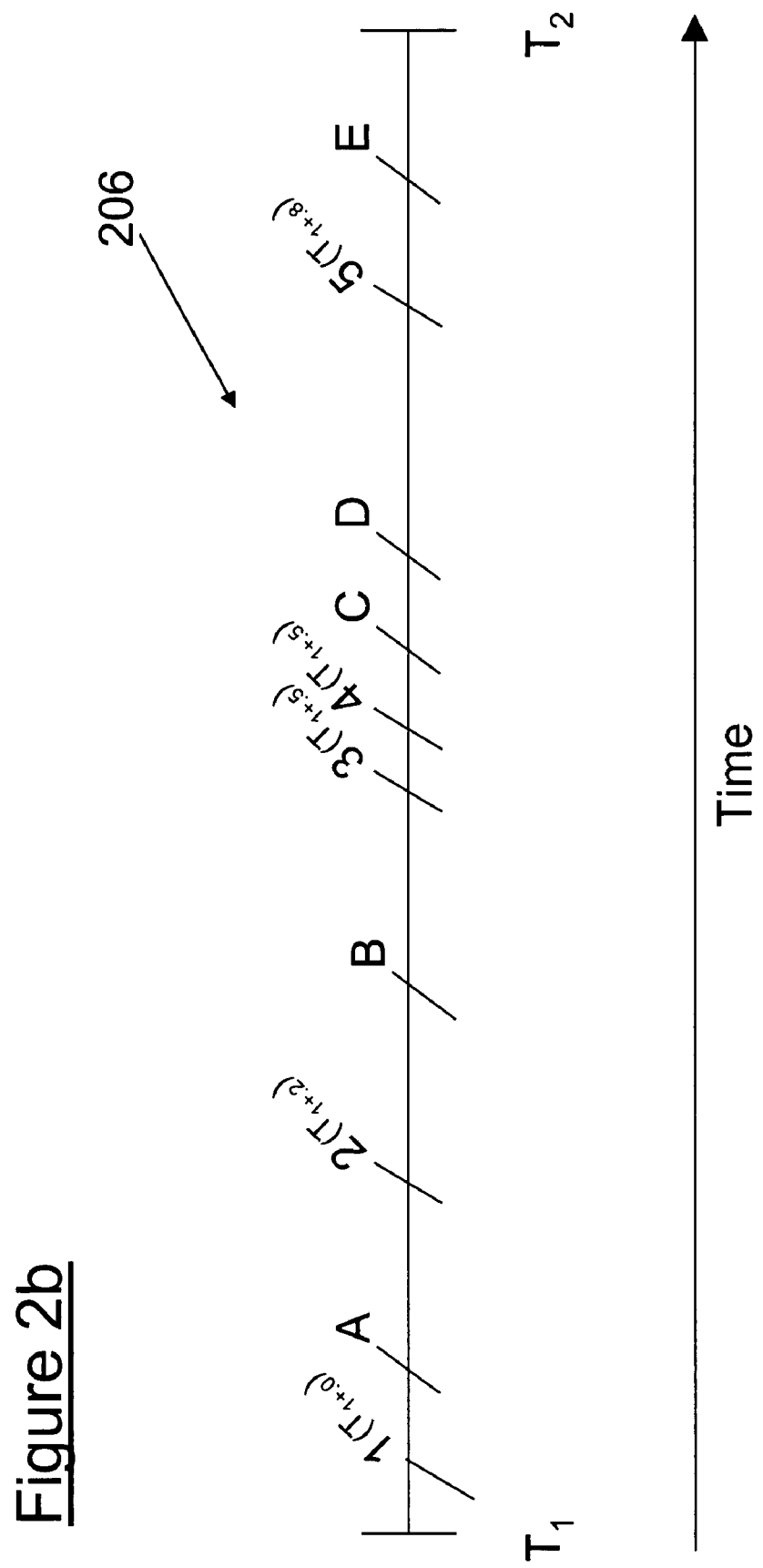

With reference now to FIG. 2, an illustration of a first log stream 202 and a second log stream 204 shows the different temporal granularity between the two streams. That is, events A-E all occur within a single time period that is equal to a first epoch between time $T_1$ and time $T_2$, although first log stream 202 does not have the temporal granularity to describe exactly where events A-E occurring during the first epoch. That is, despite the representation in FIG. 2 that event A occurred near time $T_1$, it is just as likely that event A occurred near time $T_2$, either before or after one or all of events B-E.

Second log stream 204, on the other hand, has a finer degree of temporal granularity, having multiple second time epochs, shown as time $T_{1+0.0}$, $T_{1+0.1}$, $T_{1+0.2}$, etc. Each second time epoch in second log stream 204 is less than the first time epoch in first log stream 202, such that the multiple second time epochs are within the first time epoch. While the second time epochs are depicted as $\frac{1}{10}^{th}$ increments of the first time epoch, in the preferred embodiment the second time epochs are $\frac{1}{1000}^{th}$ increments of the first time epoch or smaller. For example, the first time epochs may be the increment of time (e.g., a millisecond) that software events are logged, while the second time epochs may be the increment of time (e.g., microseconds or nanoseconds) that hardware events are logged.

Figure 2D:
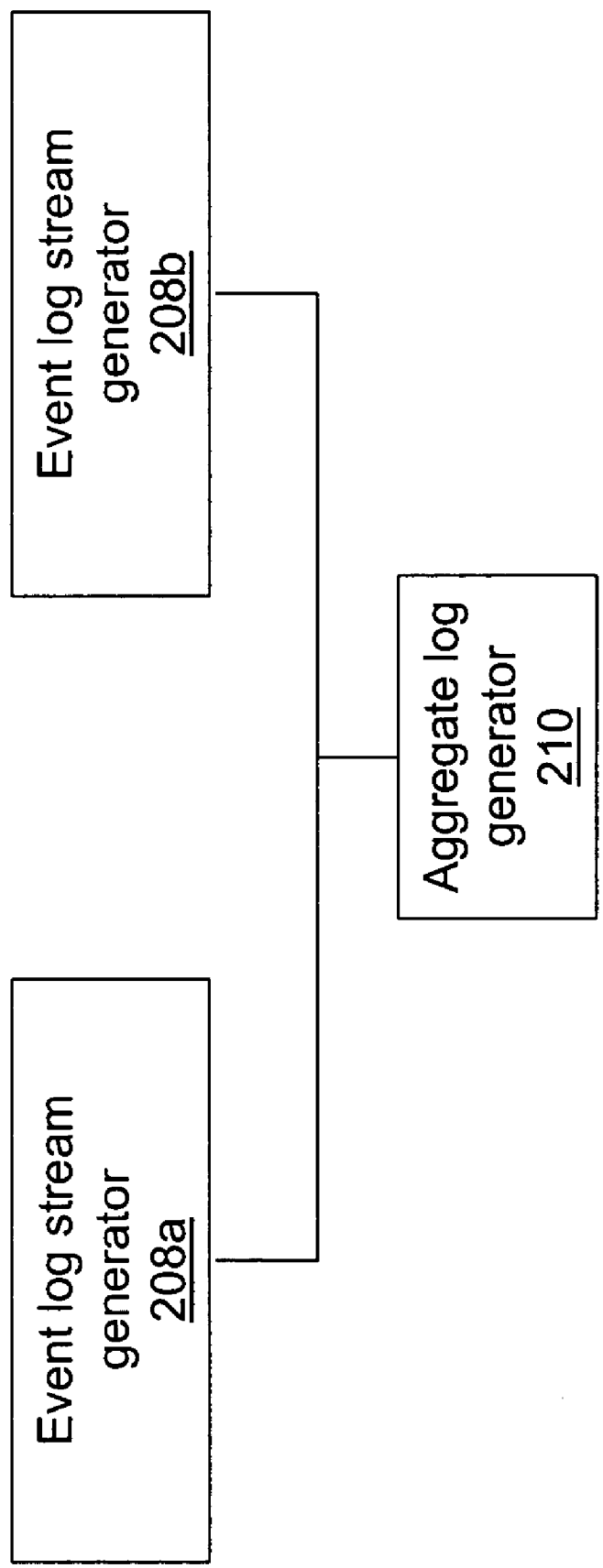

First log stream 202 and second log stream 204 are then combined into an aggregate log 206 of the data events A-E and 1-5. The generation of first log stream 202 and second log stream 204 is performed by event log stream generators 208, as shown in FIG. 2d, preferably using steps described below in FIG. 3a. Event log stream generators 208 are any combination of hardware and/or software known to those skilled in the art of computers for generating a record of events in a data processing system. In a preferred embodiment, first log stream 202 is generated by event log stream generator 208a, and second log stream 204 is generated by a separate event log stream generator 208b. Alternatively, both log streams can be generated by a single event log stream generator 208. Aggregate log generator 210 is similarly a combination of hardware and/or software that creates aggregate log 206 shown in FIG. 2c, preferably using the steps described below in FIG. 4.

Referring again to FIG. 2c, note that data events A-E are identified as occurring with the first time epoch of first log stream 202 (within times $T_1$ and $T_2$) while retaining their temporal information from the multiple second time epochs of second log stream 204. However, while the order of events 1-5 is still known (except for the ambiguity of events 3 and 4, which both occurred during second time epoch $T_{1+0.5}$), the order of events A-E is still unknown, including their temporal relationship with events 1-5.

Nonetheless, aggregate log 206 is still useful, since events 1-5 are known to have occurred before events logged in subsequent first time epochs. For example, refer to FIG. 2c, showing a first time epoch starting at time $T_1$ and another first time epoch starting at time $T_2$. Events F-G (from first log stream 202) and events 6-7 (from second log stream 204) are logged into the time epoch starting at time $T_2$. Thus, events 1-5, which have been "clumped" into the time epoch starting at time $T_1$, are properly identified as having occurred before any event (F-G and 6-7) in the time epoch starting at time $T_2$.

Figure 3A:
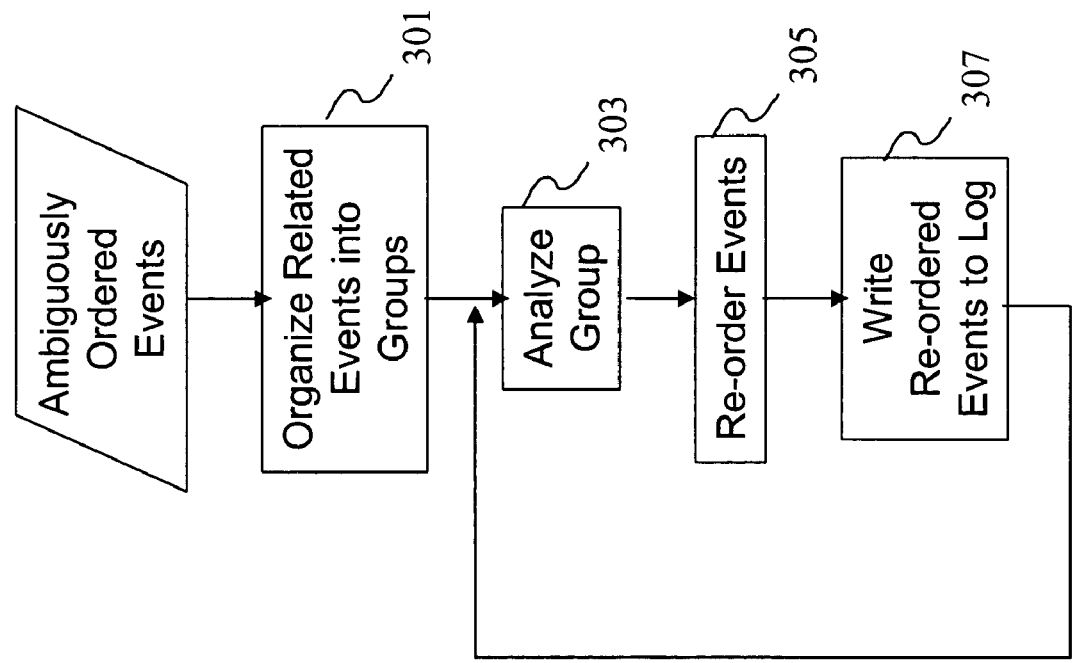
FIGS. 3a-b depicts a preferred method and system for re-ordering events in a log stream and the aggregate log.

Aggregate log 206 would be more useful, however, if events within a single time epoch could be ordered, either exactly or approximately. Steps taken to predictively order events within a single time epoch are shown in FIG. 3a. Starting with block 301, related events from ambiguously ordered events in a single time epoch are organized into groups. That is, events such as hardware events from a single piece of logic or sub-logic may be organized into a group, events from a particular software subroutine may be organized into a group, etc. The group is then analyzed (block 303), the events temporally re-ordered (block 305), and the aggregate log 206 is re-written using the new order of events.

Figure 3B:
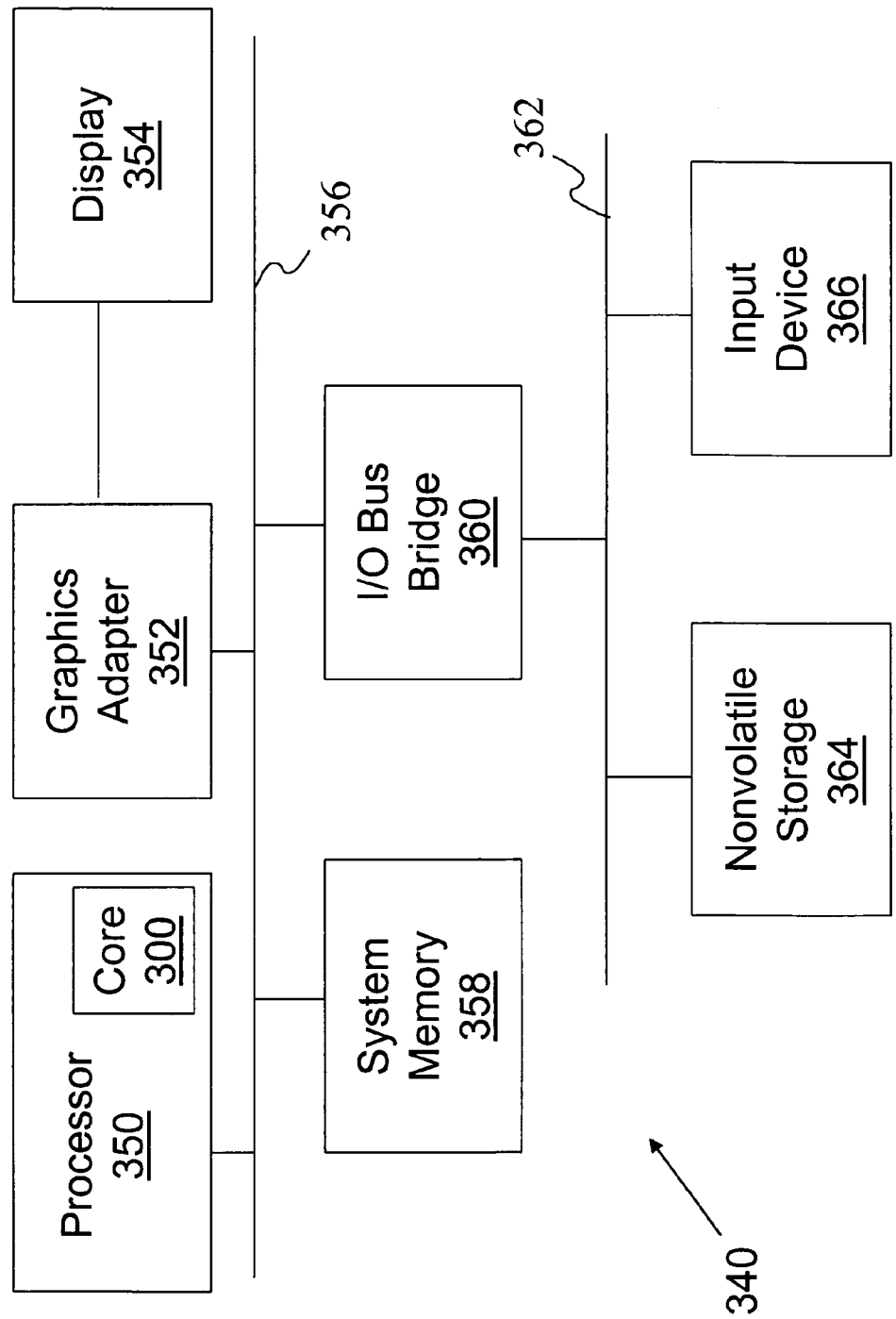

For more detail of how events can be re-ordered, consider a data processing system 340 as shown in FIG. 3b, in which a preferred embodiment of the present invention may be implemented. Data processing system 340 may be, for example, one of the models of personal computers available from International Business Machines Corporation of Armonk, N.Y. Computer system 340 may be a desktop, a laptop, a server or any other similar computing device. Data processing system 340 includes a processor 350, which is connected to a system bus 356. Within processor 350 is a core 300, about which additional detail is described below in FIG. 3b.

In the exemplary embodiment, data processing system 340 includes a graphics adapter 352 also connected to system bus 356, receiving user interface information for a display 354. Also connected to system bus 356 are system memory 358 and input/output (I/O) bus bridge 360. I/O bus bridge 360 couples I/O bus 356 to system bus 362, relaying and/or transforming data transactions from one bus to the other. Peripheral devices such as nonvolatile storage 364, which may be a hard disk drive, and input device 366, which may be a conventional mouse, a trackball, or the like, is connected to I/O bus 362.

The exemplary embodiment of data processing system 340 shown in FIG. 3b is provided solely for the purposes of explaining the invention and those skilled in the art will recognize that numerous variations are possible, both in form and function. For instance, data processing system 340 might also include a compact disk read-only memory (CD-ROM) or digital versatile disk (DVD) drive, a sound card and audio speakers, and numerous other optional components.

The system described thus far has described primarily the time epochs for first log stream 202 and second log stream 204, in which first log stream 202 has a less precise (longer) time epoch than second log stream 204. However, identification and use of least precise time epochs can be dynamic. That is, when a new log stream arrives that has less precise time epochs that previously received log streams, then the previous log streams adopt the new log stream's time epoch, while maintaining their old granularity as described above.

With reference now to FIG. 4, a flow chart is depicted showing exemplary preferred steps taken to dynamically re-define a new time epoch for previous log streams. Starting at block 402, time stamp data is read from multiple log streams. The time stamp data describes the granularity of the log stream (i.e., the length of the time epoch used by the log stream). If a log stream uses a previously described epoch (query block 404), then it is marked for re-ordering (block 406).

As shown in query block 408, if log stream uses a new time epoch that is less precise (longer) than all current log streams' time epochs, then a precision change marker is emitted (block 410) identifying this time epoch as the baseline for all log streams, and the log stream is marked for re-ordering (block 406). Otherwise, the log stream adopts a previously defined time epoch from another log stream as its benchmark time epoch (block 412) and the log stream is marked for re-ordering (block 406). The log stream is then re-ordered (block 414), preferably using the technique described in FIG. 3a, and the log stream is written to the aggregate log (block 416). The aggregate log is then re-ordered (block 418), making events in the aggregate log as properly ordered as possible, and the process ends (terminator block 420).

With the aggregate log, the cause/effect relationships between events from different log streams can be evaluated and even developed. For example, if an event "A" always occurs before an event "1," then a system can heuristically determine that event "A" likely is the cause of event "1," or at least is a required condition for event "1."

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternate embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising:
  receiving a first log stream and a second log stream generated by events occurring during a single time period, wherein events that generate the first log stream are marked by a first temporal marker defined by a first time epoch that is equal in length to the single time period, and wherein events that generate the second log stream are marked by a second temporal marker defined by multiple second time epochs, the multiple second time epochs being within the first time epoch; and
  creating an aggregate log of the first and second sets of data, wherein each said entry in the second log stream is identified as occurring within the first time epoch while retaining the temporal ordering information from the second log stream's temporal markers.

2. The method of claim 1, further comprising:
  reordering the first log stream according to a known initiator/consequential relationship between a first event in the first log stream and a second event in the second log stream.

3. The method of claim 2, further comprising:
  in response to the second event occurring during the first time epoch and the first event not occurring during the first time epoch, determining that the first event occurred during a previous time epoch that is prior to the first time epoch.

4. The method of claim 1, further comprising:
  receiving a third log stream in which each event in the third log stream is marked by a third temporal marker defined by a third time epoch that is greater than the first time epoch; and
  adding the third log stream to the aggregate log, wherein each said entry in the aggregate log is identified as occurring within the third time epoch.

5. The method of claim 1, wherein each of the multiple second time epochs is a ¹⁄₁₀ increment of the first time epoch.

6. The method of claim 1, wherein the first log stream is a record of software events and the second log stream is a record of hardware events.

7. The method of claim 1, wherein any two events logged within a single time interval in the second log stream are temporally unordered with respect to each other.

8. The method of claim 1, wherein an order of events logged in the first log stream is unknown, and wherein the method further comprises:
  aggregating related events in the first log stream according to known sources of events; and
  predictively ordering events in the first log stream by ordering aggregated related events according to known relationships between aggregated related events.

9. The method of claim 1, further comprising:
  in response to receiving a third log stream that has a third log stream time epoch, wherein the third time stream epoch has a granularity that is less than the first time epoch, applying the third log stream time epoch to the first log stream.

10. The method of claim 1, wherein each of the second time epochs is a ¹⁄₁₀₀₀ increment of the first time epoch.

11. The method of claim 1, further comprising:
  aggregating related events in the first log stream according to known sources of events, wherein the known sources of events are different hardware components of a computer system.

12. The method of claim 1, further comprising:
  aggregating related events in the first log stream according to known sources of events, wherein the known sources of events are different software components of a computer system.

* * * * *